July 31, 1956
C. S. MORRISON ET AL
2,756,865
BALE-HANDLING APPARATUS
Filed April 13, 1955
2 Sheets-Sheet 1
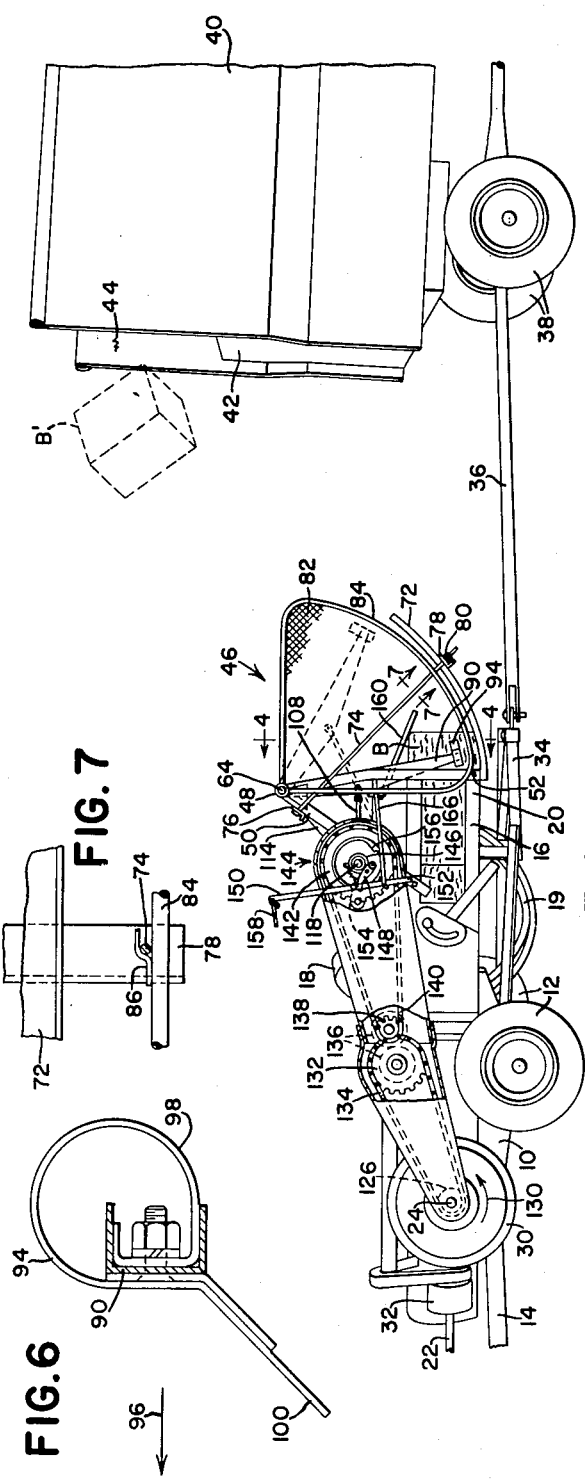
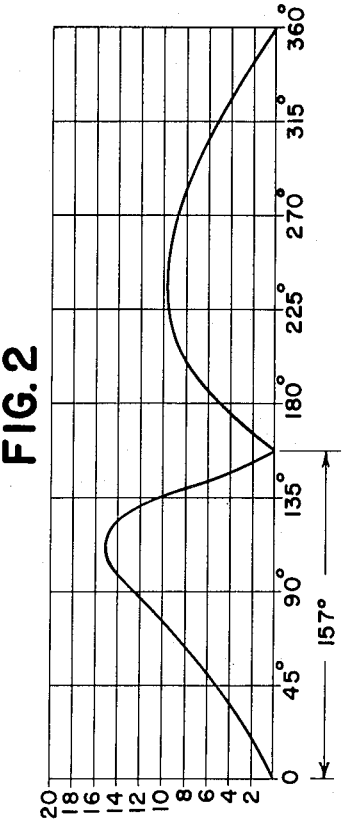
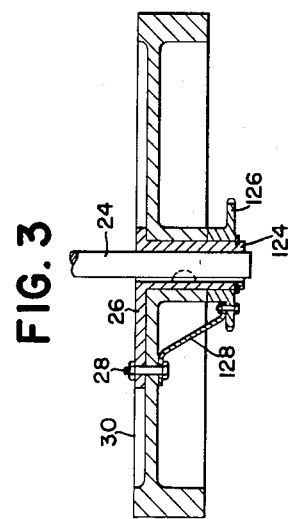
INVENTORS
C. S. MORRISON
M. W. FORTH

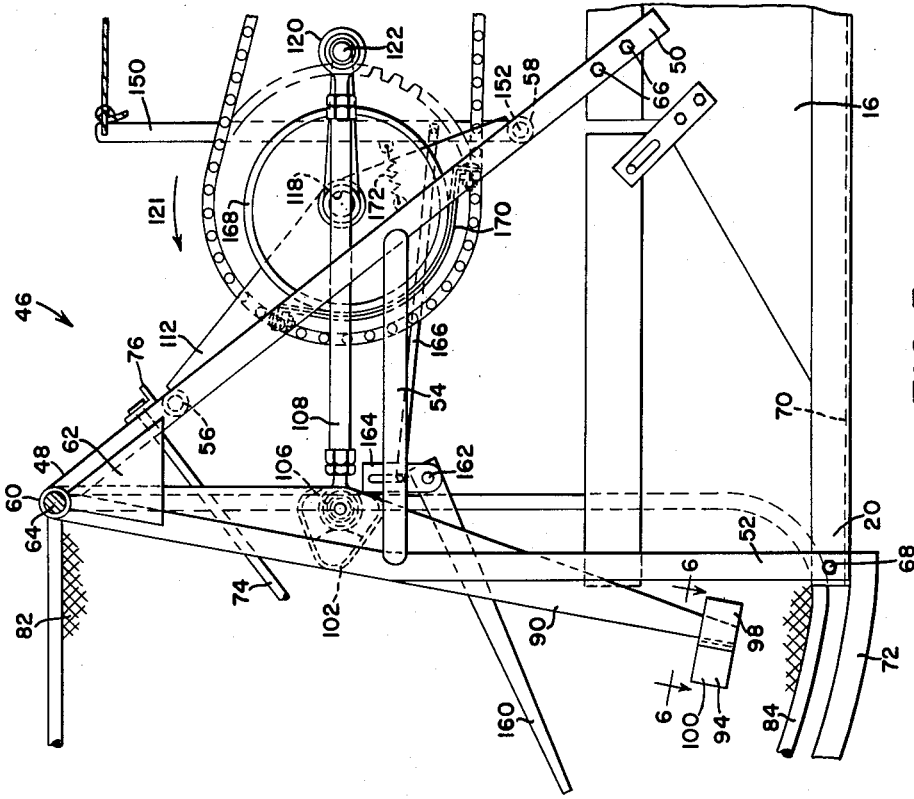
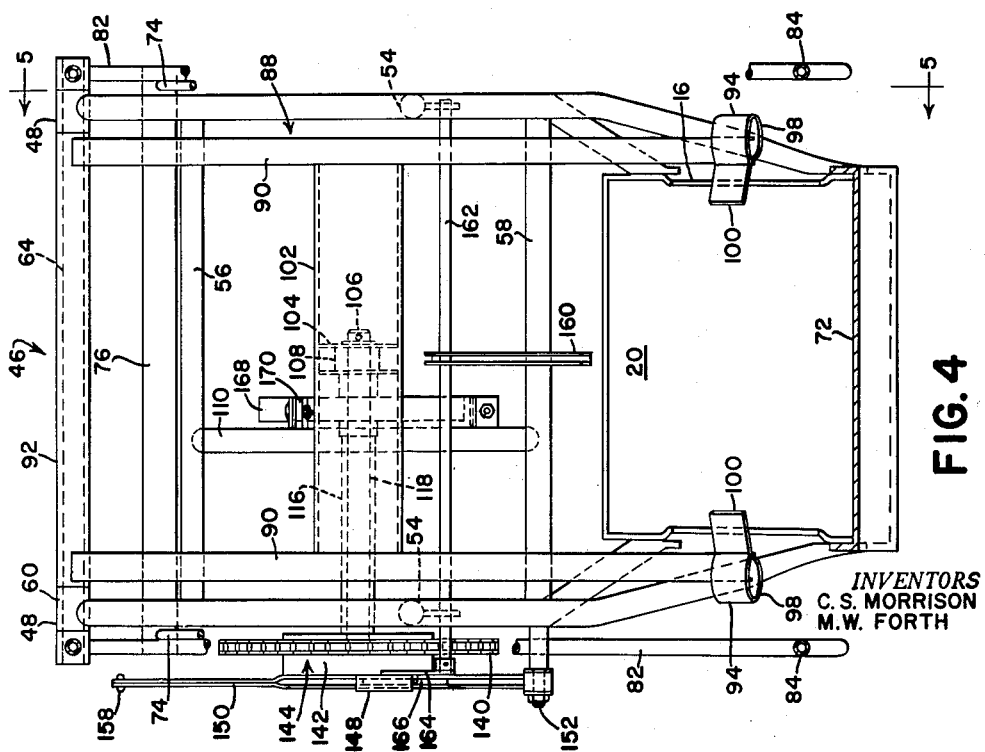

United States Patent Office 2,756,865
Patented July 31, 1956

2,756,865

BALE-HANDLING APPARATUS

Charles S. Morrison and Murray W. Forth, Moline, Ill., assignors to Deere & Company, Moline, Ill., a corporation of Illinois Application April 13, 1955, Serial No. 501,126

20 Claims. (Cl. 198—128)

This invention relates to bale-handling mechanism for use with an agricultural baler of the type in which crops are picked up, compressed, and formed into individual bales discharged in succession along a defined path.

The development of the agricultural baler as typified by the brief description above has reached the point where the entire sequence of operations is automatic and continuous, resulting in considerable saving of manual labor. However, there has existed in the past a serious break in the automatic operation, since, as the bales are discharged from the bale-forming means, there remains the problem of handling them for storage. The standard baler is equipped with a bale discharge device from which the bales are normally allowed to drop to the ground, being subsequently manually picked up and loaded on a trailer or wagon. As an improvement on this relatively primitive form of bale handling, some balers are equipped with rearwardly and upwardly inclined discharge chutes and trailer is towed directly by the baler so that as the bales emerge, the leading bales are forced upwardly along the chute to drop successively into the wagon. In this method of operation, one or more men are required to stack the bales in the trailer or wagon. In still another method, a bale loader is drawn over the field separately from the baler, this loader delivering to a wagon associated therewith. Although manual labor may be considered to be somewhat reduced, this method requires the use of an addition vehicle.

According to the present invention, all of these difficulties are eliminated and manual labor in handling the bales is not required, since the invention provides a bale-handling device or apparatus associated with the rear end of the bale case for propelling rather than simply pushing the completed bales into the trailing wagon. The throwing means is preferably arranged in the form of a swingable arm device operative through an arcuate range from a starting position to a delivery position. Successively accelerative and decelerative power means is used to actuate the arm, and the arm has bale-gripping means thereon effective to release the bale at the delivery position of the arm so that the momentum of the bale carries it in a trajectory for receipt by a wagon or trailer relatively remote from the baler. The trajectory is such that the bales are tumbled randomly into the trailer and no hand labor is required to obtain satisfactory loading.

It is one of the important features of the invention to provide the bale-throwing apparatus in the form of a simple and inexpensive attachment that may be mounted on any conventional type of baler. The invention further features the use of drive mechanism deriving its power in the first instance from driving mechanism on the baler. The invention has for a further object the use of cyclic power means, preferably in the form of a conventional one-revolution clutch for imparting to the bale-throwing means the desired acceleration and deceleration. It is a novel characteristic of the invention that the power means is selectively engageable and disengageable and is controlled by control means responsive to the discharge of a bale by the baler, so that the bale-throwing means operates at intervals on the order of the intervals of bale formation. The inventive design disclosed here includes also the utilization of floor extension means for assisting in the supporting of the bales as they are moved initially by the throwing means, together with appropriate guard means enclosing the device from opposite sides so as to eliminate operational hazards.

The foregoing and other important objects and desirable features inherent in and encompassed by the invention will become apparent as a preferred embodiment thereof is disclosed in detail in the ensuing description and accompanying sheets of drawings, the several figures of which will be described immediately below.

Fig. 1 is a composite view showing the use of the bale-throwing apparatus in conjunction with a rearwardly discharging baler and a towed trailer.

Fig. 2 is a graphic illustration of the acceleration and deceleration of the bale-throwing means in relation to the means by which it is powered.

Fig. 3 is a fragmentary sectional view showing part of the drive means for the bale thrower.

Fig. 4 is an enlarged rear view, partly in section, as seen along the line 4—4 of Fig. 1.

Fig. 5 is a side view, on the scale of Fig. 4 and partly in section, as seen along the line 5—5 of Fig. 4.

Fig. 6 is an enlarged view of one of the bale-engaging devices, the view being partly in section as seen along the line 6—6 of Fig. 5.

Fig. 7 is a fragmentary view, on an enlarged scale, as seen along the line 7—7 of Fig. 1.

The baler chosen for the purposes of illustration is of the so-called "in-line" type, comprising a main frame 10 carried on wheels 12 and including a forwardly extending tongue 14 by means of which the baler may be connected to and powered by a tractor (not shown). The baler has bale-forming means including a horizontal fore-and-aft bale case 16 in which bales are formed as by a reciprocating plunger (not shown). A typical baler is shown in the U. S. Patent to Paul 2,665,631. The formation of successive individual bales includes compression by the plunger and tying by suitable tying mechanism, familiarity with which by those skilled in the art will be assumed. In the present instance, the numeral 18 represents a tying mechanism housing and the numeral 19 represents one of a pair of needles that are moved across the bale case into association with the tying mechanism. As the bales are completed, they emerge or are discharged rearwardly along a defined horizontal path, exiting at a bale-discharge portion constituted by the open rear end 20 of the bale case 16. An emerging bale is designated by the letter B in Fig. 1.

The baler includes drive mechanism powered in the first instance by an input or propeller shaft 22 which is connected to the power take-off shaft (not shown) of the pulling tractor. The shaft 22, by any appropriate means not important here, delivers power to a transverse shaft 24 which in turn drives the baler plunger (not shown). As shown in Fig. 3, the shaft 24 has keyed thereto an arm 26 which is connected by a shear pin or shear bolt 28 to a flywheel 30. This arrangement is not unconventional, the purpose of the shear bolt 28 being to guard against damage to the mechanism in the event that operation of the plunger or associated parts in inadvertently prevented. The shear bolt 28 will break, releasing the flywheel for free rotation so that the kinetic energy thereof does not add to the difficulty already being experienced. Power transmission between the shaft 22 and the shaft 24 is discontinued because of a slip clutch conventionally contained in a unit designated generally here by the numeral 32. As already indicated, this construction, to the extent described, typifies that used in most balers, and the Paul patent, referred to above, may be resorted to for clarification, it being understood that the precise details have no limiting effect on the present invention.

The baler frame has connected thereto a suitable rearwardly extending hitch frame 34 to which is pivotally connected the forward end of a wagon or trailer tongue 36, the trailer in this case being supported on front and rear wheels (only the front wheels of which are shown at 38) and including a receptacle or box 40 having relatively high sides but a comparatively low transverse front wall 42 so that a bale-receiving opening 44 is afforded at the front end of the box.

The bale-handling or bale-throwing apparatus is designated in its entirety by the numeral 46. As will be seen, it is positioned at the rear or discharge end 20 of the bale case 16 and its purpose is to deliver discharged bales from the baler to the trailing wagon, a trajected bale being indicated at $B^1$.

The apparatus includes supporting structure made up of a pair of transversely spaced apart frames 48, each in the form of an inverted V and having a front leg 50 and a rear leg 52. The supporting structure is rigidified by a plurality of braces, including fore-and-aft braces 54, rigidly secured as by welding between the front and rear legs of the frames and transverse or cross braces 56 and 58 between the front legs 50.

The front and rear legs of each frame are joined at the point of the inverted V by a tubular member 60 and a gusset plate 62 for strength. The tubular member 60 are transversely alined to afford pivot means on a transverse axis directly above the discharge end 20 of the bale case 16, the pivot axis here being afforded by a transverse stationary shaft 64. The supporting structure, comprising the frames 48 as aforesaid, has means thereon for effecting the affixation or connection thereof to the baler, the means here taking the form of a plurality of removable fasteners such as bolts 66 for the front legs 50 and bolts 68 for the rear legs 52. In this manner, the apparatus may be furnished as an attachment for balers of existing design. Because of the relatively inexpensive and lightweight but strong construction of the apparatus, it may be readily mounted on and dismounted from the baler.

The bale case 16, as is conventional, has a rearwardly extending horizontal floor 70 over which the bales B move as they are formed. It is to be understood that completion of the bales may or may not include tying. In other words, the tying of the bale is not essential to the operation of the bale-throwing device. Hence, it will be assumed that the emerging bales are complete and ready for handling. To facilitate the operation of the bale-throwing means, the supporting structure includes a floor extension 72, the forward portion of which is rigidly secured to portions of the rear legs 52 that project somewhat below and at opposite sides of the discharge end 20 of the bale case. This floor extension, as best shown in Figs. 1, 4 and 5, is formed as an arc about the pivot axis of the shaft 64. Additional support for the floor is afforded by a pair of braces or tie rods 74 secured at their upper ends to a transverse bar or angle 76. These tie rods extend downwardly and rearwardly and are adjustably connected at their lower ends to a transverse bar or angle 78 that is in turn rigidly secured, as by welding, to the under rear portion of the floor extension 72. Adjustability is accomplished by means of nuts 80 threaded onto the ends of the tie rods.

The supporting structure additionally carries, at each side of the throwing apparatus, a sector-shaped screen guard 82, the pivot shaft 64 being extended at opposite ends (Fig. 4) to support the apices of the guards. The arcuate portion of each guard, as at 84, is connected to the associated tie rod 74 by a retaining clip 86 (Fig. 7).

The supporting structure carries thereon, by means of the pivot axis afforded by the transverse shaft 64, a bale-throwing element or bale-moving means designated in its entirety by the numeral 88. This element or means comprises a pair of arms 90, rigidly cross-connected at their upper ends by a tube 92 that is journaled on the pivot shaft 64. The arms depend from the pivot shaft and have lower or free ends terminating short of the floor extension 72. Each of these ends is equipped with a releasable bale-engaging device or means 94, the details of which are best shown in Fig. 6. In that figure, the arrow 96 represents not only the direction of bale emergence but also the direction of movement of the throwing arms (Fig. 5; full lines in Fig. 1) to a delivery or throwing position (dotted lines in Fig. 1). As seen in Fig. 6, each bale-engaging or -gripping means comprises a length of spring steel bent to form a loop 98 and a free inwardly and rearwardly directed extension or tooth 100. The tooth 100 is yieldable in the direction of the arrow to accommodate the emerging bale, the strength of the device being such as to cause it to bite into the bale as the bale emerges. Because of the resilient character of the devices, they are capable of releasing the bale when the throwing arms 90 reach their delivery or throwing position, whereby the bale is trajected to the wagon as indicated at $B^1$ in Fig. 1.

In addition to the rigid cross-connection at 92, the arms 90 are rigidly cross-connected intermediate their ends by a transverse, substantially V-shaped member 102, within and substantially midway between the ends of which is provided suitable web means 104 to which a transverse pivotal connection 106 is made with the rear end of a force-transmitting or driving connection in the form of a pitman 108.

The transverse supporting structure braces 56 and 58 are connected by a fore-and-aft rigid member 110, and this member and the forward leg 50 of the left-hand frame 48 respectively carry supporting plates 112 and 114 between which is rigidly mounted a transverse tubular bearing 116 for journaling a crankshaft 118. This crankshaft forms part of power means or power-operated mechanism having accelerative and decelerative charateristics as will presently appear.

The right-hand end of the shaft 118 has rigidly fixed thereto a radial crank 120 to which the front end of the pitman 108 is pivotally connected at 122. From the description thus far, it will be seen that rotation of the crankshaft 118 in the direction of the arrow 121 will effect movement of the throwing arms 90 on a throwing or delivery stroke away from their starting position. One of the basic features of the invention is to modify the throwing and return strokes so that the arms are capable of trajecting rather than merely moving the bale from the discharge end of the bale case to the trailing wagon box 40. This result is itself novel and is accomplished in the manner to be described below.

Power for the power means including the crankshaft 118 is obtained in the first instance from the baler shaft 24 on which the flywheel 30 is mounted by means of the shear bolt 28, all as previously described. The shear bolt arm 26 has a hub extension 124 on which is journaled a small sprocket 126. Driving connection to the shaft 24 is effected by means of a strap 128, one end of which is connected to the sprocket 126 and the other end of which is connected to the shear bolt 28. Hence, when the shaft 24 and flywheel 30 rotate under normal operating conditions, the sprocket 126 is rotated in the direction of the arrow 130. An intermediate but larger sprocket 132 is appropriately journaled on the bale case 16 substantially midway between the shaft 24 and the power means shaft 118. A chain 134 interconnects the sprockets 126 and 132. In order that the necessary direction of rotation of the shaft 118 may be obtained, the sprocket 132 is gear-connected at 136 to a second smaller sprocket 138 which is in turn connected by a chain 140 to the sprocket portion of a driving or constantly rotating part 142 of a suitable one-revolution clutch, designated in its entirety by the numeral 144, and including, as is conventional, a normally disengaged or disconnected driven or intermittently rotating part 146. As is conventional, a spring-loaded pawl 148 effects connection and disconnection between the constantly and intermittently rotating parts of the clutch, as will appear below.

For all practical purposes, the connection of the sprocket 126 to the baler drive mechanism by means of the shear pin 28 and strap 128 will not modify normal functioning of the baler. If the shear bolt 28 shears, the sprocket 126 may continue to be driven by the now coasting flywheel 30. However, the relative mass of the driven parts connected to the sprocket 126 is fairly negligible. If it should happen that the portion of the shear bolt 28 that remains between the strap 128 and flywheel 30 drops out, the flywheel will continue alone without driving the sprocket 126. The importance of the driving connection is basically that it affords a convenient connection to the baler drive mechanism.

As is conventional, the spring loading on the clutch pawl 148 is such as to bias the pawl for engagement of the one-revolution clutch 144. However, the bias of the pawl is normally opposed by control means including a control lever 150 pivoted at its lower end at 152 to the supporting structure. This lever has intermediate its ends a roller 154 that engages the pawl and prevents the pawl spring from moving the pawl into position to be engaged by the hump 156 in the constantly rotating clutch part 142. The lever 150 is manually controllable, as by a pull rope 158, but, in view of the automatic operation of the clutch, by means to be presently described, manual control is used only in emergencies or for other deliberate tripping of the clutch.

The automatic feature of the clutch-tripping mechanism is effected by a feeler or bale-sensing member 160 which is pivoted at one end by means of a transverse rockshaft 162 carried between the fore-and-aft braces 54 of the frame structures 48. The free end of the feeler or member 160 projects downwardly and rearwardly and into the path of an emerging bale (Figs. 1 and 5). Rigid on the left-hand end of the rockshaft 162 is an upstanding slotted arm 164, and this arm is connected by a fore-and-aft extending link 166 to the control lever 150. As the bale B emerges to a predetermined extent, the feeler member 160 is lifted, causing forward shifting of the link 166 which in turn moves the control lever 150 forwardly, clearing the control lever roller 154 from the pawl 148. The bias of the pawl is such as to swing the pawl for engagement by the hump 156 of the constantly rotating clutch part 142, whereupon cyclic or one-revolution operation of the clutch 144 is effected. This causes 360-degree rotation of the crankshaft 118 in the direction of the arrow 121 so that the crank and pitman 108 are effective to drive the throwing arms 90 on their throwing or propelling stroke and on their return stroke.

The successively accelerative and decelerative characteristics of the apparatus are graphically illustrated in Fig. 2, wherein the ordinate represents the velocity of the throwing arms 90 in feet per second (assuming that the speed of the power shaft 118 is 55 R. P. M.), and the abscissa represents 360 degrees of angular movement of the shaft 118. The characteristics of the mechanism, stated briefly, are that the power means, represented by the clutch 144, when engaged, operates through a cycle of 360 degrees, beginning with an idle or demobilized status and terminating at the same status. The force-transmitting connection, represented by the pitman 108, between the crank 120 and the throwing arms 90, is such that the throwing arms reach their peak velocity upon rotation of the crankshaft 118 in the first approximately 110 degrees of its complete cycle, at which time the throwing arms 90 will occupy the position shown in dotted lines in Fig. 1. Because of the constantly increasing rate of acceleration, the bale is trajected as shown at B¹ even though the arms 90 are subsequently reversed for return to their starting position. Instrumental in this phase of the operation is the fact that the bale grippers 94 are releasable to permit the bale to depart from the throwing arms when they reach their maximum velocity, which occurs before they reach the limit of their throwing or propelling stroke. The first part of the curve in Fig. 2 shows that the rate of acceleration increases along a curve to its peak and then falls off rapidly (or decelerates) to such an extent that the arms are in effect halted momentarily as they traject the bale. There is acceleration and then deceleration of the throwing arms on their return stroke but these phases are not as marked as those in the throwing phase. That is to say, the design is such that the return of the throwing arms 90 to their starting position is accompanied by sufficient deceleration to prevent undue shocks. To further augment the retarding of the throwing arms on their return stroke, the mechanism includes a retarding device, here in the form of a brake drum 168 keyed eccentrically to the shaft 118 and cooperating with an arcuate brake strap 170, the structure and function of which will be apparent without further description, it being sufficient to note only that the eccentricity of the brake drum is such that the brake has no effect while the crankshaft is moving the arms on their throwing stroke.

The cooperation between the automatic sensing means 160 and the automatic demobilizing of the clutch 144 after it completes one revolution combine to give the mechanism a cyclic operation. As will be familiar to those skilled in the art, the lever 150, after it has been moved forwardly to release the pawl 148, is returned to its original position, as by a return spring 172, whereupon as the pawl arrives at its starting position it is disengaged when it contacts the roller 154 on the lever 150.

The rope control at 158 affords manual release of the lever 150 for operation of the clutch 144 in the event that it is desired to actuate the throwing arms independently of actuation thereof by the sensing means 160. Such an event would occur, for example, when the operator realizes that the throwing mechanism might be automatically operated as he is turning a corner, in which case the trajected bale would miss the wagon box 40. In a case of this kind, if the emerging bale B is about ready to trip the clutch, the operator may manually trip the clutch prematurely so as to throw the bale into the wagon box 40 before the corner is turned. There may be, of course, other instances in which manual tripping of the clutch 144 will be necessary.

Various features of the invention have been outlined at the beginning of the specification and others will have appeared as the description progressed. Still others will occur to those versed in the art, as will many modifications and alterations in the preferred embodiment of the invention illustrated, all of which may be achieved without departing from the spirit and scope of the invention.

What is claimed is:

1. For a baler having bale-forming means including a bale-discharge portion from which individual completed bales emerge in succession as the baler operates: bale-throwing apparatus for throwing each emerging bale distantly from the bale-discharge portion of the baler, comprising supporting structure having means thereon for connection thereof to the baler; a bale-throwing element having a starting position proximate to the bale-discharge portion of the baler; means connecting said element to the supporting structure for movement thereof on a throwing stroke away from and on a successive return stroke back to said starting position; power-operated mechanism on the supporting structure and including a driving connection to the bale-throwing element, said mechanism having a demobilized status while said element is in its starting position and being mobilizable for cyclic operation terminated by said demobilized status for affording successive acceleration and deceleration of the bale-throwing element on its throwing stroke and successive acceleration and deceleration of said element on its return stroke; bale-engaging means on said element for receiving and engaging an emerging bale, said means being releasable when said element reaches maximum velocity on its throwing stroke to enable departure of the bale beyond said element; and control means for effecting mobilizing and demobilizing of the power-operated mechanism, including a bale-sensing device operative automatically, in response to a bale-forming condition including emergence of a bale to be engaged by the bale-receiving means, to mobilize the mechanism for cyclic operation thereof.

2. The invention defined in claim 1, in which: the power-operated mechanism includes a normally disengaged one-revolution clutch, a crank driven thereby and a pitman connecting the crank to the bale-throwing element; and the control means operates to effect engagement and then disengagement of said clutch.

3. The invention defined in claim 1, in which: the supporting structure includes pivot means above the bale-discharge portion and transverse to the bale-emergence path; the bale-throwing element comprises arm means depending from the pivot means and its throwing stroke is arcuately upwardly away from the starting position and its return stroke is arcuately downwardly toward said starting position.

4. The invention defined in claim 3, including arcuate floor structure forming an extension of the bale-discharge portion and formed about the pivot means, said floor structure extending upwardly and away from the bale-discharge portion for a part of the throwing stroke of the bale-throwing element to assist in supporting the bale engaged by said element.

5. The invention defined in claim 1, including: manually operative means connected to the control means for emergency mobilization of the power-operated mechanism.

6. The invention defined in claim 1, including: retarding means in the power-operated mechanism operative to assist in the deceleration of the power-operated mechanism on the return stroke of the bale-throwing element.

7. The invention defined in claim 1, in which: the power-operated mechanism includes a crankshaft having a cycle of 360°, and brake means is connected to said shaft for braking said shaft as the power-operated means attains its demobilized status.

8. The invention defined in claim 1, including: guard means carried by the supporting structure, spaced apart transversely on the order of the width of a bale and positioned respectively at opposite sides of the bale-throwing element and extending in the direction of movement of said element.

9. For a baler having drive mechanism and a bale case including a rear discharge end from which completed individual bales emerge in succession along a generally horizontal path and in a rearward direction as the baler operates: bale-throwing apparatus for throwing each emerging bale rearwardly distant from the baler, comprising supporting structure having means thereon for the connection thereof to the baler and including upright members projecting above the bale case and pivot means carried by said members on a transverse axis; a pair of bale-throwing arms depending from the pivot means and having a starting position in which the free ends of the arms are proximate to the open end of the bale case and are spaced apart transversely so that an emerging bale will pass between them, said arms being swingable in unison about the pivot means to travel in an upward and rearward throwing stroke and a downward and forward return stroke back to said starting position; bale-gripping means on the arms for engaging an emerging bale as such bale passes between the arms, said means being operative to release the bale from the arms on the throwing stroke to enable the bale to be trajected beyond the limit of the throwing stroke of the arms; a crank journaled on the supporting structure for rotation through 360°; a pitman connecting the crank to the arms for effecting the throwing and return strokes of the arms in the 360° rotation of the crank; a one-revolution clutch including a driving part connected to the baler drive mechanism, a driven part connected to the crank, and selectively engageable and disengageable means for connecting and disconnecting the clutch parts, said means being normally disengaged while the arm means is in its starting position; and control means connected to the selectively engageable and disengageable means for effecting connection of the clutch parts to cause rotation of the crank.

10. The invention defined in claim 9, in which: the control means includes a bale-sensing device operative in response to a predetermined extent of emergence of a bale to automatically effect connection of the clutch parts.

11. The invention defined in claim 10, in which: the control means additionally includes manually operative means for effecting emergency operation of said control means.

12. For a baler having drive mechanism including a power driven member and a flywheel connected to the member by a shear pin and wherein the baler has a rear discharge end from which completed individual bales emerge in succession along a generally horizontal path and in a rearward direction as the baler operates: bale-throwing apparatus for throwing each emerging bale rearwardly distant from the baler, comprising supporting structure having means thereon for the connection thereof to the baler and including upright members projecting above the bale case and pivot means carried by said members on a transverse axis; a pair of bale-throwing arms depending from the pivot means and having a starting position in which the free ends of the arms are proximate to the open end of the bale case and are spaced apart transversely so that an emerging bale will pass between them, said arms being swingable in unison about the pivot means to travel in an upward and rearward throwing stroke and a downward and forward return stroke back to said starting position; bale-gripping means on the arms for engaging an emerging bale as such bale passes between the arms, said means being operative to release the bale from the arms on the throwing stroke to enable the bale to be trajected beyond the limit of the throwing stroke of the arms; a crank journaled on the supporting structure for rotation through 360°; a pitman connecting the crank to the arms for effecting the throwing and return strokes of the arms in the 360° rotation of the crank; a one-revolution clutch including a driving part coaxial with the flywheel and connected to the shear pin, a driven part connected to the crank, and selectively engageable and disengageable means for connecting and disconnecting the clutch parts, said means being normally disengaged while the arm means is in its starting position; and control means connected to the selectively engageable and disengageable means for effecting connection of the clutch parts to cause rotation of the crank.

13. For a baler having a bale case including a rear discharge end from which completed individual bales emerge in succession along a generally horizontal path and in a rearward direction as the baler operates: bale-handling apparatus for moving emerging bales away from the rear end of the bale case, comprising supporting structure having means thereon for connection thereof to the baler; bale-carrying means carried by the supporting structure for movement from a bale-receiving position to a bale-delivering position and return; power-operated mechanism connected to the bale-carrying means and demobilized while said bale-carrying means is in its bale-receiving position and mobilizable to operate in a cycle terminated by demobilization thereof for moving the bale-carrying means to its bale-delivering position and return; and control means for effecting operation of the mechanism automatically in response to the emergence of a bale to the bale-carrying means, said control means including a bale feeler movable on the supporting structure and projecting into the path of an emerging bale so as to move away from an initial position toward an operating position as the bale emerges and so as to return to its initial position in the absence of an emerging bale, and force-transmitting means connecting the feeler to the power-operated mechanisms for mobilizing said mechanism upon movement of the feeler to its operating position and for demobilizing said mechanism upon return of said feeler to its initial position.

14. A bale-throwing apparatus of the character described, comprising: a pair of upright frames, each in the form of an inverted V having front and rear legs, each leg having a free lower end and said frames being laterally spaced apart; transverse means rigidly cross-connecting the frames; pivot means at the points of the V's and providing a transverse pivot axis; a pair of transversely spaced arms mounted on and depending from the pivot means substantially alongside the rear legs of the frames; bale-gripping means on the free end of each arm; drive means supported on the front legs of the frames in forwardly spaced relation to the arms and including a drive connection extending rearwardly toward and connected to the arms for swinging the arms rearwardly and then forwardly about the pivot.

15. The invention defined in claim 14, in which: a transverse rigid member has its opposite ends connected respectively to the arms; and the drive connection is connected to said member substantially midway between the ends thereof.

16. The invention defined in claim 14, in which: the lower ends of the rear legs project below the free ends of the arms; arcuate floor means formed about the transverse pivot is connected to the lower ends of the rear legs and curves upwardly and rearwardly; and transversely spaced apart brace members are connected to the frames and extend rearwardly and downwardly and are connected to transversely spaced apart rear portions of said floor means.

17. The invention defined in claim 16, including: a pair of transversely spaced apart guards, one outside of and extending rearwardly from each arm; means connecting forward portions of the guards to the frames; and means connecting rearward portions of the guards respectively to the floor means brace members.

18. For a baler having bale-forming means including a bale-discharge portion from which individual completed bales emerge in succession as the baler operates: bale-throwing apparatus for throwing each emerging bale distantly from the bale-discharge portion of the baler, comprising: supporting structure having means thereon for connection thereof to the baler; a bale-throwing element having a starting position proximate to the bale-discharge portion of the baler; means connecting said element to the supporting structure for movement thereof on a throwing stroke away from and on a successive return stroke back to said starting position; bale-engaging means on said element for receiving and engaging an emerging bale, said means being releasable on the throwing stroke to enable departure of the bale beyond said element; selectively engageable and disengageable power-operated mechanism on the supporting structure and including a driving connection to the bale-throwing element, said mechanism being disengaged while said element is in its starting position and engageable to actuate the bale-throwing element on its throwing and return strokes; and control means for effecting engagement of the power-operated mechanism, including a bale-sensing device operative automatically, in response to a bale-forming condition including emergence of a bale to be engaged by the bale-receiving means, to engage the mechanism for actuating the bale-throwing element.

19. For a baler having bale-forming means including a bale-discharge portion from which individual completed bales emerge in succession as the baler operates: bale-throwing apparatus for throwing each emerging bale distantly from the bale-discharge portion of the baler, comprising: supporting structure having means thereon for connection thereof to the baler; a bale-throwing element having a starting position proximate to the bale-discharge portion of the baler; means connecting said element to the supporting structure for movement thereof on a throwing stroke away from and on a successive return stroke back to said starting position; bale-engaging means on said element for receiving and engaging an emerging bale, said means being releasable on the throwing stroke to enable departure of the bale beyond said element; power-operated mechanism on the supporting structure and including a driving connection to the bale-throwing element, said mechanism having a demobilized status while said element is in its starting position and being mobilizable for cyclic operation terminated by said demobilized status for affording successive acceleration and deceleration of the bale-throwing element on its throwing stroke and successive acceleration and deceleration of said element on its return stroke; and control means for effecting mobilizing and demobilizing of the power-operated mechanism.

20. For a baler having bale-forming means including a bale-discharge portion from which individual bales are discharged in succession as the baler operates: bale-propelling apparatus comprising supporting structure having means thereon for connection thereof to the baler; bale-moving means movably carried by the supporting structure for travel from a starting position adjacent to the bale-discharge portion to a delivery position relatively remote from said portion; successively accelerative and decelerative power means connected to and for energizing the bale-moving means to travel toward its delivery position in successive accelerative and decelerative phases; and releasable bale-engaging means on the bale-moving means for engaging a discharged bale in the starting position of said bale-moving means and for carrying the bale toward said delivery position, said bale-engaging means being releasable from the bale upon deceleration of the bale-moving means to cause the momentum of the bale to carry it beyond said delivery position.

No references cited.